Feb. 3, 1931. R. BOSSHARD 1,791,051
ADJUSTABLE POCKET VISOR OR EYESHADE
Filed Sept. 6, 1928 2 Sheets-Sheet 1
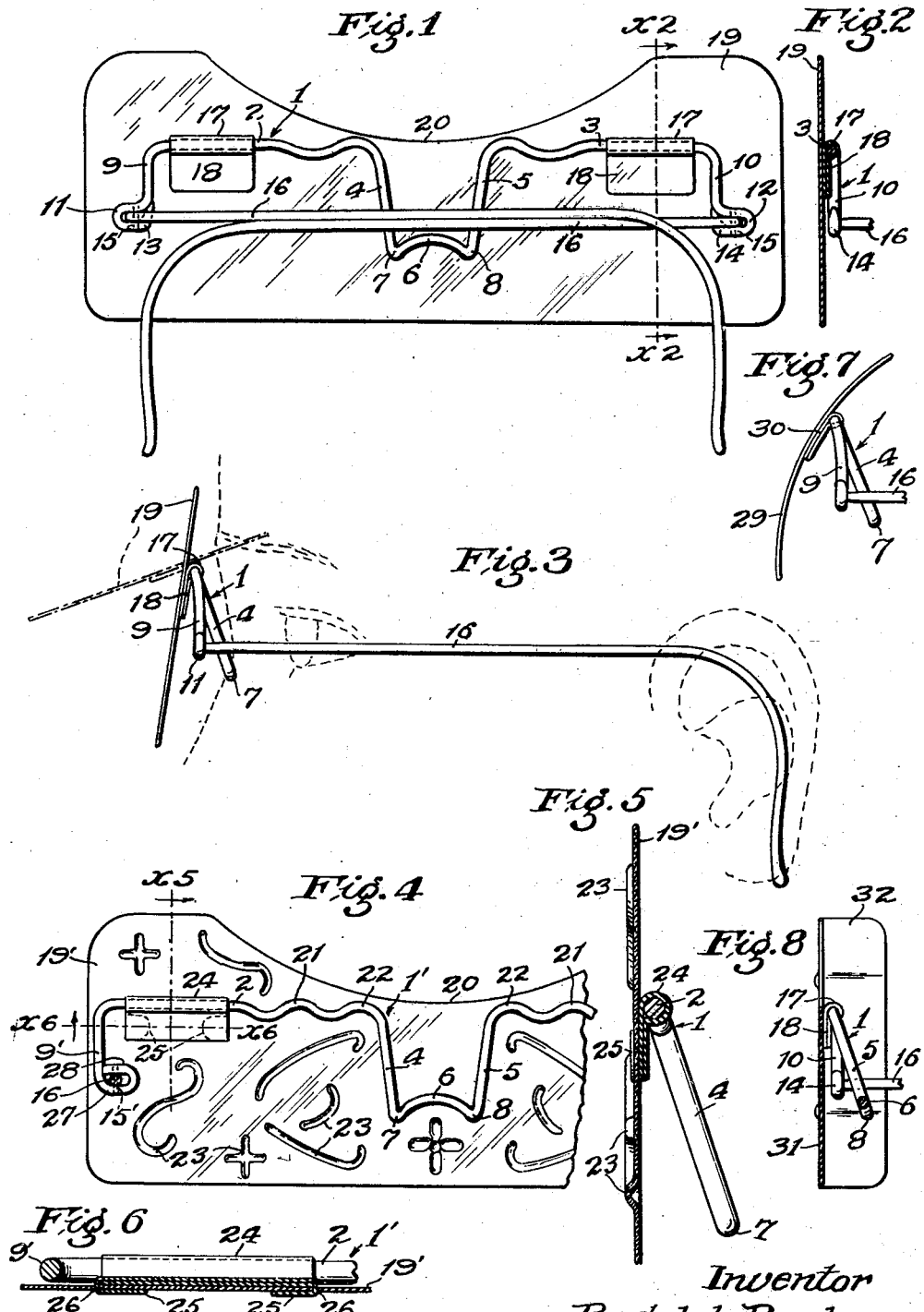
Inventor
Rudolph Bosshard
by James R. Townsend
his atty
Witness
C. H. Whitmore Feb. 3, 1931.     R. BOSSHARD     1,791,051
ADJUSTABLE POCKET VISOR OR EYESHADE
Filed Sept. 6, 1928     2 Sheets-Sheet 2
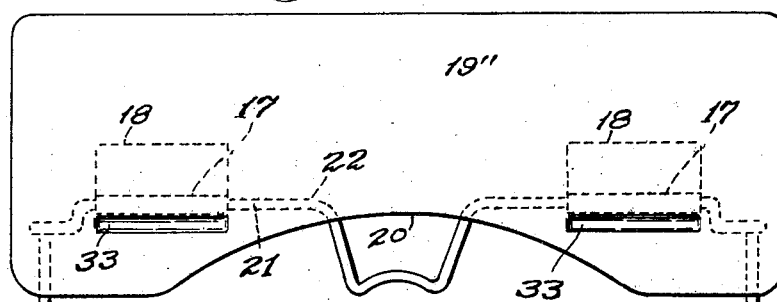
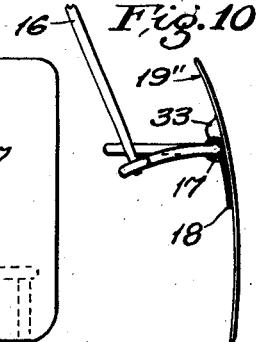
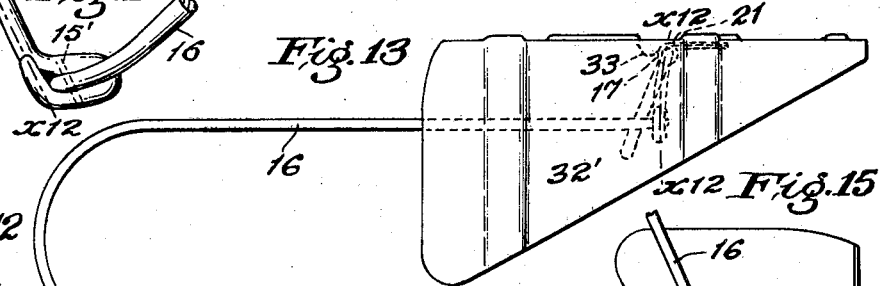
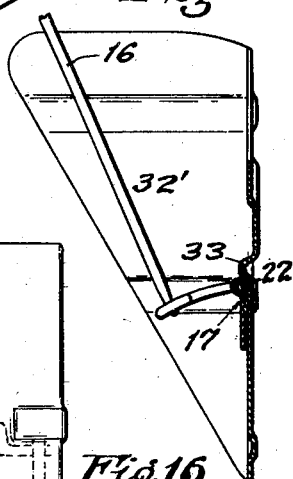
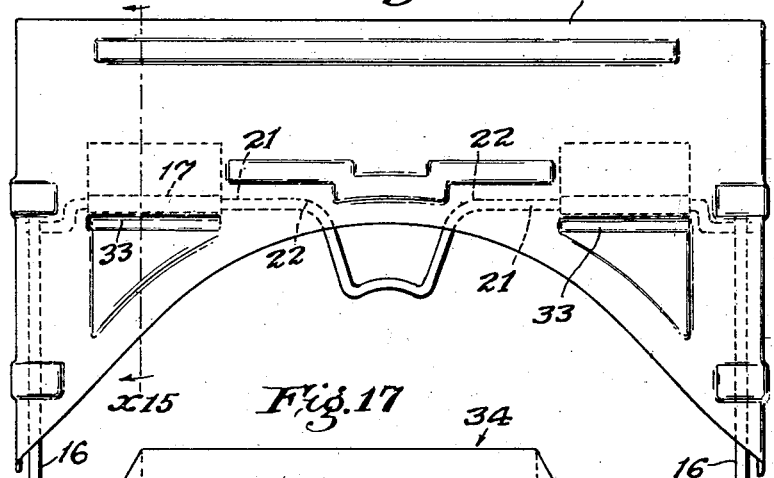
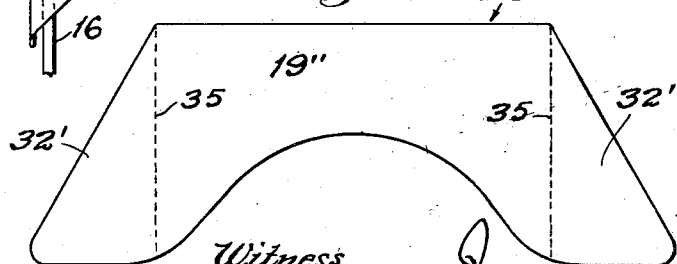
Inventor
Rudolph Bosshard
by James R. Townsend
Witness
C. H. Whitmore Patented Feb. 3, 1931

1,791,051

UNITED STATES PATENT OFFICE

RUDOLPH BOSSHARD, OF LOS ANGELES, CALIFORNIA

ADJUSTABLE POCKET VISOR OR EYESHADE

Application filed September 6, 1928. Serial No. 304,373.

This invention comprises an eye protecting visor wherein the main shade or shield element is a flat elongated plate and yet is adapted to fit so snugly on the forehead as to prevent direct rays of light from reaching the eyes from above.

An object is to provide a simple and inexpensive eye shade, the light intercepting element of which may be stamped from a flat sheet of celluloid, aluminum or the like and so disposed and made to conform to the forehead of the wearer as to protect the eyes from conflicting light rays.

I have provided a device of the character set forth, wherein the light intercepting element extends completely across the forehead and down at the side and may be adjusted to a proper focal plane to protect the eyes of the wearer during welding, brazing or like operations.

An object is to provide a simple and inexpensive shade that affords means for preventing the penetration of the direct or side rays of the sun to the eyes of the wearer.

Another object is to mount the light deflecting element upon the supporting frame of the device in such manner that when in shade position the said light deflecting element will conform to the forehead and when adjusted for use as an eye protector will extend forth a considerable distance above and below the eyes.

Another object is to provide means whereby the shade element of an eye shield may be made of thin sheet celluloid, and means given ample strength and stability and which may likewise serve as a decorative embellishment.

An object is to make from inexpensive material a device of the character described that is simple of construction, and economical to manufacture and the parts of which are capable of quick and easy assembly.

An advantage is light weight upon the wearer.

Another object is to make provision whereby temples for the light eye shade may be located at any place between the edges of the shade so that the shade sheet may extend its upper edge further above the eyes, or further below the eyes as may be desired, and so that the attachment between the shade or light deflecting plate and the frame may be strong and firmly seated on the plate.

Other objects, advantages and features of invention may appear from the accompanying drawing, the subjoined detailed description and the appended claims.

The accompanying drawings illustrate the invention.

Figure 1 is a rear view of one form of eye shield with the temples in folded position.

Fig. 2 is a section on line $x2$, Fig. 1, the temples being broken away.

Fig. 3 is a side view of the eye shield shown in Fig. 1, as being applied to the head, indicated in dotted lines. The position of the shield for use as a shade is shown in broken lines.

Fig. 4 is a fragmental view partly in section of another form.

Fig. 5 is an enlarged section on line $x5$, Fig. 4, the temples being omitted.

Fig. 6 is an enlarged section on line $x6$, Fig. 4, illustrating the attachment of the shield to the frame.

Fig. 7 is a side view of another form, the temples being broken away.

Fig. 8 is an intermediate cross section of a further form with the frame and a temple broken away.

Fig. 9 is a plan view of another form with parts adjusted to wearing position, the temples being broken to contract the view.

Fig. 10 is an elevation looking at the right end of Fig. 9 with the rear edge up and the shield slightly curved.

Fig. 11 is an enlarged fragmental perspective view illustrating the joint between the celluloid frame and the celluloid temple.

Fig. 12 is a section of the hinge joint on line $x12$, Fig. 13.

Fig. 13 is a side view of a form having side guards and made of reinforced thin sheet material.

Fig. 14 is a plan view of the same.

Fig. 15 is a section on line $x15$, Fig. 14 with rear edge up.

Fig. 16 is an enlarged view of a hinge loop, cemented to a fragment of a plate, and ready to receive the frame.

Fig. 17 is a view of a stamping from which the forms shown in Figs. 13, 14, and 15 may be pressed.

The details of the improved eye shield illustrated in the drawings are as follows:—

Referring first to the form shown in Fig. 1, the supporting frame 1 is formed of a single piece of material, such as a stamping or a wire of celluloid and by bending or punching, and has straight alined shaft portions 2 and 3, arm portions 4 and 5 extending downwardly and rearwardly at an angle toward each other; and the nose bridge portion 6, connecting the lower ends of the arm portions 4 and 5 by return bends 7 and 8. Adjacent the ends, the frame 1 is bent downwardly at right angles to the shaft portions 2 and 3 to provide arms 9 and 10 and at right angles to said arms and by return bends 11 and 12 to dispose the frame ends 13 and 14 in straight alinement with the shaft portions 2 and 3 to form hinge fittings which have pin connection 15 with the supporting temples 16.

Bearing straps are formed of flat strips of celluloid as illustrated in Figs. 1, 2, 3 and 8 and bent on to the shaft portions 2 and 3 while the flat portions 18 of the straps are cemented onto the light deflecting plate 19, to form hinge connections for the plate to the frame. Each of said straps comprises two leaves 18 connected by a loop 17 bent onto the shaft and two flat portions or leaves 18, one of which is cemented onto the plate 19 and to the other leaf.

The plate 19 may be constructed of suitable material such as celluloid and may be colored or tinted, as required to protect the eyes of the wearer from the glare of sunlight, but for use as an eye protector during the operation of welding or brazing and the like, the plate would be formed of glass. This plate is preferably of rectangular shape and the upper edge thereof is cut inwardly in arcuate plane to provide a recess 20 to accommodate the forehead of the wearer of the eye shield.

Ordinarily, when the device is to be used as a shade, the plate may be adjusted, so that the same extends forwardly and downwardly relative to the eyes as illustrated in dotted position in Fig. 3 and when used as a shield, when weather conditions are bad, the plate 19 may be turned downwardly as indicated in full lines in Fig. 3, so as to protect the eyes from flying material or dust or too bright a glare.

The frame wire 1, as illustrated in Fig. 4, between the inner ends of the shaft portions 2 and 3, and the nose bridge, is undulated and thus forms bearing peaks 21 and 22 which engage with the plate or shield to frictionally hold the same in any adjusted position upon the frame as illustrated in Fig. 3.

Thus, I have produced an eye shield having a supporting frame, including a nose bridge and a protective plate or shade adjustably mounted on the frame and adapted to be swung down to different positions relative to the eyes and to be frictionally held in an adjusted position.

In the forms of the device illustrated in Fig. 4, I indent the plate 19' on one surface and form irregular extending ridges 23, adapted to refract the light rays passing therethrough and likewise to strengthen and add to the decorative embellishment of the same. Likewise, in this instance the frame 1' is attached to the plate 19' by a form of bearing consisting of thin straps 24 that are bent onto and practically encircle the shaft portions 2 and 3 of the frame and that are provided with tongues 25 adapted to project through suitable openings 26 in the plate 19' and bent over thereupon; and the arms 9', 10' of the frame 1' are bent inwardly at right angles as at 27 and return bends 28 are disposed parallel with the portions 27. Pins 15' pass through the frame portions 27 and 28 and the ends of temples 16 to form proper hinge connections.

In the form illustrated in Fig. 7, the shade plate 29 and the straps 30 connecting the plate to the frame are of arcuate configuration in cross section. This form is particularly adapted for use in conjunction with eye glasses and to fit thereover, the semi-arcuate configuration of the shade permitting the spanning of the eye glasses when the device is used as an eye shade.

The modification illustrated in Fig. 8, shows the plate 31 formed with end flanges 32, which serve to protect the eyes from the rays of light at the sides of the head.

In Figs. 9 and 10 reinforcing abutments 33 for the loops 17 of the journal strip are impressed from the top side of the plate 19'' and the journal strips are cemented to such abutments and to the inside of said plate.

The same arrangement is shown in Figs. 13, 14 and 15.

From the nature of the views in Fig. 9, 10, 13, 14 and 15 the bearing peaks 21 and 22 are not visible but the locations thereof are indicated by 21 and 22 with broken line leaders.

Some of the parts corresponding to parts hereinbefore described are indicated by characters corresponding to those in the other views and distinguished therefrom by exponents.

In Figs. 9 and 10 inwardly imprinted reinforcements 33 are shown to form abutments against which the bearing loops are set. In Figs. 13 and 15 forwardly diminishing side guards 32' are formed by bending down the ends of a blank 34 shown on a small scale in Fig. 17 in which broken lines 35 indicate the line of the bend.

The hinge by which the frame is secured to the sheet material of the eye shading plate is first formed as a rectangular stamping to form leaves $a$ and is then heat-softened and bent by a suitable heated jig, not shown, is bent centrally to form the loop $b$ having when closed an internal diameter equal to the diameter of the alined straight journal portions 2 and 3 of the frame.

The leaves are secured to the celluloid plate 19, 19' or 19'' by cementing one of the leaves to such plate by means of glacial acetic acid. Then the frame is laid flat on the plate with the alined straight shafts in the loops. Then the other leaf members are brought into place, cemented there by application of said acid, care being taken that the wire and the journal loops are kept free from acid so that the frame may be turned into use position indicated in Figs. 3, 9, 10, 13, 14 and 15.

If it is desired to fix the frame relative to the plate, this may be done by holding the frame in the required use position, and applying acid to the straight portions that will be embraced by the loop when it is closed and cemented in place; or the frame may be stuck to the plate directly by means of said acid.

It is ordinarily preferred that the frame be foldable on the plate.

The frame and the temples formed of celluloid may be made from punchings of sheet celluloid, or of celluloid wire bent into form under a temperature at which the celluloid is sufficiently softened for the purpose; and holes for the pivots 15' may be made by running a needle through the softened celluloid.

At present I prefer to make the entire eyeshade and shield of celluloid, with the exception that metal pivots 15' are used for connecting the temples to the frame.

The celluloid may be worked on metal jigs that are kept at a celluloid softening temperature of about or slightly more than 75 degrees C. or 167 degrees F., and when cooled, become resilient and holds its shape at normal temperatures as is well known in the art.

The celluloid sheets may be stamped into blanks as indicated in Figs. 1 and 4 and also into blanks as indicated in Fig. 17 and then formed by heated dies or jigs, not shown, and thus brought to the appropriate molding temperature. Such heating may be by any suitable means as by immersing the dies or jigs in hot water, or by passing hot water through channels therein, not shown, and the celluloid stampings are molded in said jigs or by said dies into the form required, and are then removed and put into a cooler to bring them to a temperature at which they will hold their shape.

I claim:—

1. In an eye shade comprising a celluloid sheet, a nose bridge frame having alined straight bearings, and temples on said frame; celluloid bearing straps, each comprising two leaves and a loop connecting said leaves; said loops encircling the alined bearings respectively; one of the leaves being cemented to the other leaf and to the celluloid plate intermediate the edges of the plate.

2. An eye shade comprising a celluloid sheet; a nose bridge frame having alined straight bearings and temples on said frame, and celluloid bearing straps, each comprising two leaves and having a loop between said leaves, encircling the alined bearings; said leaves being cemented to the celluloid plate and to each other; said plate being provided with reinforcing indentations from one side forming ridges on the other side to stiffen the plate; and forming on the under side of the plate abutments against which the loops are cemented respectively to give rigidity to the shade.

3. An eye shield comprising a frame formed of a single piece of material having straight alined shaft portions and a nose bridge provided intermediate said shaft portions, temples for supporting said frame, means for connecting said temples to the frame, a plate hinged to said shaft portions, and said frame between the shaft portions and nose bridge being undulated to form contact points adapted to frictionally engage said plate for holding the same in adjusted positions.

4. An eye shield comprising a frame formed of a single piece of material having straight alining shaft portions, and a nose bridge disposed therebetween, temples hinged to said frame, a plate hingedly connected to the shaft portions and having one edge cut away and adapted to fit over the temples of the wearer of the shield, and said frame between the shaft portions and nose bridge being undulated to provide contacts for frictionally engaging said plate to hold the same in an adjusted position relative to the eyes of the wearer of said shield.

In testimony whereof, I have hereunto set my hand at Los Angeles, California, this 9th day of August, 1928.

RUDOLPH BOSSHARD.